(12) United States Patent
Duffett-Smith et al.

(10) Patent No.: US 7,359,719 B1
(45) Date of Patent: Apr. 15, 2008

(54) RADIO POSITIONING SYSTEMS

(75) Inventors: Peter James Duffett-Smith, Cambridge (GB); James Paul Brice, Cambridge (GB); Paul Hansen, Cambridge (GB)

(73) Assignee: Cambridge Positioning Systems Limited, Cambridge (GB)

( * ) Notice: Subject to any disclaimer, the term of this patent is extended or adjusted under 35 U.S.C. 154(b) by 292 days.

(21) Appl. No.: 09/830,447

(22) PCT Filed: Jun. 1, 2000

(86) PCT No.: PCT/GB00/02104

§ 371 (c)(1),
(2), (4) Date: Apr. 27, 2001

(87) PCT Pub. No.: WO00/73813

PCT Pub. Date: Dec. 7, 2000

(30) Foreign Application Priority Data

Jun. 1, 1999 (GB) .................................. 9912724.3

(51) Int. Cl.
*H04Q 7/20* (2006.01)
(52) U.S. Cl. ................................ 455/456.6; 455/456.1; 455/526; 455/423; 455/67.11; 342/387; 342/465
(58) Field of Classification Search .. 455/456.1–456.3, 455/524–526, 67.1, 423, 67.11; 342/463–465, 342/387
See application file for complete search history.

(56) References Cited

U.S. PATENT DOCUMENTS

| | | | | |
|---|---|---|---|---|
| 5,045,861 A | * | 9/1991 | Duffett-Smith | 342/457 |
| 5,293,645 A | * | 3/1994 | Sood | 455/456.2 |
| 5,600,706 A | * | 2/1997 | Dunn et al. | 455/456.2 |
| 5,689,270 A | * | 11/1997 | Kelley et al. | 342/357.09 |
| 5,859,612 A | * | 1/1999 | Gilhousen | 342/457 |
| 5,883,598 A | * | 3/1999 | Parl et al. | 342/457 |
| 6,035,202 A | * | 3/2000 | Camp, Jr. | 455/456.1 |
| 6,094,168 A | * | 7/2000 | Duffett-Smith et al. | 342/463 |
| 6,108,315 A | * | 8/2000 | Freeburg et al. | 370/310 |
| 6,166,691 A | * | 12/2000 | Lindqvist | 342/465 |
| 6,275,705 B1 | * | 8/2001 | Drane et al. | 455/456.2 |
| 6,310,576 B1 | * | 10/2001 | Johnson | 342/465 |
| 6,347,228 B1 | * | 2/2002 | Ludden et al. | 455/456.5 |
| 6,445,928 B1 | * | 9/2002 | Ruutu et al. | 455/502 |
| 2003/0146871 A1 | * | 8/2003 | Karr et al. | 342/457 |

FOREIGN PATENT DOCUMENTS

WO    WO 9711384 A1 *   3/1997

* cited by examiner

*Primary Examiner*—Sharad Rampuria
(74) *Attorney, Agent, or Firm*—Roylance, Abrams, Berdo & Goodman, L.L.P.

(57) ABSTRACT

The invention described relates to a radio positioning system primarily for a mobile telephone network, in which a list of offsets in time, phase, frequency, or derivatives thereof, or their equivalents expressed as offsets in distance or derivatives thereof, of a plurality of transmission source signals, received at a given location, relative to a common reference are generated. Data is acquired from one or more receivers, the positions of which may be known or determined. Such data are offsets in time, phase, frequency, or derivatives thereof, respectively of signals received from the transmission sources relative to a reference source in each receiver or to each other. The acquired data is combined for calculating the list of offsets relative to the common reference.

15 Claims, 9 Drawing Sheets

RADIO POSITIONING SYSTEMS

FIELD OF THE INVENTION

The present invention relates generally to improvements in radio positioning systems and their methods of operation and, more particularly, to methods and apparatus for simplifying the acquisition of data required in such systems.

BACKGROUND OF THE INVENTION

EP-A-0 303 371, the contents of which are hereby incorporated by reference, describes a radio navigation and tracking system which makes use of independent radio transmitters set up for other purposes. The signals from each transmitter, taken individually, are received by two receiving stations, one at a fixed and known location, and the other mounted on the mobile object whose position is to be determined. A representation of the signals received at one receiving station is sent via a link to a processor at the other receiving station, where the received signals are compared to find their phase differences or time delays. Three such measurements, made on three widely spaced independent transmitters, are sufficient to determine the position of the mobile receiver in two dimensions, i.e. its position on the ground. The phase or time offset between the master oscillators in the two receivers is also determined.

"CURSOR", as the system described in EP-A-0 303 371 is known, is a radio positioning system which can use the signals radiated by existing non-synchronised radio transmitters to locate the position of a portable receiver. Unlike some other systems which use the temporal coherence properties of networks of purpose-built synchronised transmitters, CURSOR makes use of the spatial coherence of the signals transmitted by single transmitters. In a further development (see EP-A-0 880 712 & WO-A-99/21028), the technology has been applied to find the position of a mobile phone handset in a GSM or other digital telephone system, and these are examples of an 'Enhanced Observed Time Difference' (E-OTD) method using the down-link signals radiated by the network of Base Transceiver Stations (BTS) of the telephone system.

In the digital mobile telephone application described in EP-A-0 880 712, the contents of which are hereby incorporated by reference, the signals from each BTS within range of the handset are received both by the handset itself and by a fixed nearby receiver, the Location Measurement Unit (LMU), whose position is accurately known. Representations of the received signals are passed to a Mobile Location Centre (MLC) where they are compared in order to find the time difference between them. FIG. 1 shows the geometry of a standard two-dimensional system. The origin of Cartesian co-ordinates x and y is centred on the LMU positioned at O. The orientation of the axes is immaterial, but may conveniently be set so that the y axis lies along the north-south local map grid. The handset, R, is at vector position r with respect to the LMU position O. A BTS, A, is shown at vector position a.

Consider first the signals from BTS A. The time difference, $\Delta t_a$, measured between the signals received at R and O is given by $$\Delta t_a = (|r-a|-|a|)/\upsilon + \epsilon,$$

where $\upsilon$ is the speed of the radio waves, $\epsilon$ is the clock time offset between the clocks in the receivers at R and O, and the vertical bars each side of vector quantities denote that it is the magnitude of the vectors which are used in the equation. The value of $\epsilon$ represents the synchronisation error between the measurements made by the two receivers. Similarly, may be written for two other BTSs (B and C) at vector positions b and c (not shown):

$$\Delta t_b = (|r-b|-|b|)/\upsilon + \epsilon,$$

$$\Delta t_c = (|r-c|-|c|)/\upsilon + \epsilon. \quad (1)$$

The values of $\Delta t_a$, $\Delta t_b$, $\Delta t_c$, are measured by the methods disclosed in EP-A-0 880 712 and the values of a, b, c, and $\upsilon$ are known. Hence the equations (1) can be solved to find the position of the handset, r, together with the value of $\epsilon$.

In WO-A-99/21028, the contents of which are hereby incorporated by reference, it is described how these same time offsets can be measured using locally-created templates in a GSM telephone system as follows. Suppose that the handset R has recorded a short burst of the GSM signals from BTS A. Contained within that recording is the framing structure, synchronisation bursts and other 'given' data (or predetermined values) which are a constant feature of those transmissions. The processor within the handset can create a matching template, based on the known structure of the network signals. Received signals can then be matched by the locally-generated template. When the template finds a match, the correlation peak at the position of best match corresponds to the time offset between the received signals and the local clock inside the handset. For the signals radiated by BTS A this measured time offset, $\Delta t_{a1}$, is given by $$\Delta t_{a1} = (|r-a|)/\upsilon + \alpha_a + \epsilon_1,$$

where $\alpha_a$ is the time offset of the BTS transmissions and $\epsilon_1$ is the time offset of the handset's internal clock, both relative to an imaginary universal 'absolute' clock. The signals from BTSs B and C may also be measured in the same way, giving $$\Delta t_{b1} = (|r-b|)/\upsilon + \alpha_b + \epsilon_1,$$

and $$\Delta t_{c1} = (|r-c|)/\upsilon + \alpha_c + \epsilon_1. \quad (2)$$

The same measurements can also be made by the LMU, giving $$\Delta t_{a2} = (|a|)/\upsilon + \alpha_a + \epsilon_2,$$

$$\Delta t_{b2} = (|b|)/\upsilon + \alpha_b + \epsilon_2,$$

and $$\Delta t_{c2} = (|c|)/\upsilon + \alpha_c + \epsilon_2, \quad (3)$$

where $\epsilon_2$ is the time offset of the LMU's internal clock relative to the same imaginary universal absolute clock. Subtracting equations 3 from equations 2 gives $$\Delta t_a = \Delta t_{a1} - \Delta t_{a2} = (|r-a|-|a|)/\upsilon + \epsilon,$$

$$\Delta t_b = \Delta t_{b1} - \Delta t_{b2} = (|r-b|-|b|)/\upsilon + \epsilon,$$

and $$\Delta t_c = \Delta t_{c1} - \Delta t_{c2} = (|r-c|-|c|)/\upsilon + \epsilon, \quad (4)$$

where $\epsilon = \epsilon_1 - \epsilon_2$. It will be noted that equations 4 are just like equations 1, and can be solved in the same way to find the position of the handset, r, and the value of $\epsilon$.

It will be apparent that the CURSOR method as described above, in common with all other methods which use the signals from non-synchronised transmitters, requires a network of LMUs to be set up within the coverage area of the telephone system. These units act as reference points at which the unsynchronised signals radiated by the BTSs are measured for comparison with the same signals received by a handset. Each position measurement requires a match to be made between the signals received by the handset from a number of nearby BTSs, and signals received by an LMU from the same set of BTSs. In practice, it is often difficult to find a match using just one LMU, especially if the LMU network is sparse, since the handset may receive signals from BTSs not received by the LMU, and vice-versa. It is therefore necessary to combine the measurements from two or more LMUs. However, each new LMU brought into the calculation adds a further unknown clock time offset ($\epsilon_2$, $\epsilon_3$ etc.), each of which therefore requires an additional BTS measurement to provide the extra equation needed to solve for all the unknown quantities.

One solution to this problem is presented in WO-A-99/21028 where it is shown how the LMU network can be synchronised. Referring to FIG. 2, suppose that an adjacent pair of LMUs, $U_1$ and $U_2$, can see a common BTS. The positions of the LMUs and the BTS are all known, so a single measurement of the BTS signals by each LMU is sufficient to determine the clock time offset between the LMUs. For example, suppose that the distance from $U_1$ to the BTS is $s_1$, and the distance from $U_2$ to the BTS is $s_2$. $U_1$ measures time offset $\Delta t_1$ and $U_2$ measures $\Delta t_2$, given by $$\Delta t_1 = s_1/v + \alpha + \epsilon_{21},$$

$$\Delta t_2 = s_2/v + \alpha + \epsilon_{22}, \quad (5)$$

where $\alpha$ is the time offset of the BTS transmissions, and $\epsilon_{21}$ and $\epsilon_{22}$ are the time offsets of the LMU internal clocks in $U_1$ and $U_2$ respectively. Subtracting the second equation from the first yields $$\epsilon_{21} - \epsilon_{22} = \Delta t_1 - \Delta t_2 + s_1/v - s_2/v, \quad (6)$$

which is the relative time offset of the clock in $U_1$ with respect to that in $U_2$. This process may be repeated for a second pair of LMUs, say $U_2$ and $U_3$, and another BTS whose signals can be received by both members of this second pair of LMUs. In this way a synchronisation map may be calculated, which provides the clock offsets of all the LMU internal clocks relative to one of them adopted as a master 'LMU network clock time'. Having established the LMU synchronisation map in this fashion, a CURSOR position measurement can then include any number of LMUs without the penalty of adding an extra unknown time offset for every LMU, since the relative LMU time offsets are known.

The receivers discussed in the preceding paragraphs make measurements of time offsets. More generally, receivers can measure time offsets, phase offsets (which can be converted into time offsets with a modulo 360° ambiguity), frequency offsets or rates of change of frequency offsets. Though these measurements are of different quantities, the present invention is applied usefully to each of them as, when combined with similar measurements made by a second receiver, they can independently provide positional information. Positioning systems making use of these measurements are discussed in a related U.S. Pat. No. 6,529,165 filed simultaneously herewith.

SUMMARY OF THE INVENTION

The present invention teaches how the same advantages of an (effectively) synchronised LMU network may be obtained by setting up one or more 'virtual LMUs' in the network which act as interface nodes for the real LMUs.

According to a first aspect of the invention, there is provided a method of generating a list of offsets in time, phase, frequency, or derivatives thereof, or their equivalents expressed as offsets in distance or derivatives thereof, of a plurality of transmission source signals, corresponding to a given location, relative to a common reference, the method comprising (a) acquiring data from two or more receivers, the positions of which may be known or determined, the data from a receiver comprising offsets in time, phase, frequency, or derivatives thereof respectively of signals received from the transmission sources relative to a reference source in each receiver or to each other; and (b) combining the acquired data and calculating the list of offsets corresponding to the given location relative to the common reference.

In practice the offsets from the list can be used in place of offsets obtained directly from the receiver or receivers.

The relative offsets in time, phase, frequency, or derivatives thereof, with respect to each other or with respect to a reference source, of the signals received by a first receiver from a plurality of the transmission sources may be represented by corresponding offsets or differences in the distances between the transmission sources and the first or second receivers.

The invention also includes apparatus using the method above, the apparatus comprising (a) means for acquiring data from two or more receivers, the positions of which may be known or determined, the data from a receiver comprising offsets in time, phase, frequency, or derivatives thereof respectively of signals received from the transmission sources relative to a reference source in each receiver or to each other; and (b) means for combining the acquired data and calculating the list of offsets corresponding to the given location relative to the common reference.

In a method using techniques similar to or as described in EP-A-0 880 712, in place of offsets in time, phase, frequency, or derivatives thereof, or their equivalents expressed as offsets in distance or derivatives thereof, data representative of the received signals may be used, from which the offsets of signals received from the transmission sources relative to the reference source may be determined.

Therefore, the invention also includes a method of generating a list of offsets in time, phase, frequency, or derivatives thereof, or their equivalents expressed as offsets in distance or derivatives thereof, of a plurality of transmission source signals, corresponding to a given location, relative to a common reference, the method comprising (a) acquiring data from two or more receivers, the positions of which may be known or determined, the data from a receiver being representative of the received signals;

(b) determining from the acquired data the offsets in time, phase, frequency, or derivatives thereof respectively of signals received from the transmission sources relative to a reference source or to each other; and (c) combining the offsets so determined and calculating the list of offsets corresponding to the given location relative to the common reference.

The invention also includes apparatus for carrying out the method described immediately above, the apparatus comprising
(a) means for acquiring data from two or more receivers, the positions of which may be known or determined, the data from a receiver being representative of the received signals;
(b) means for determining from the acquired data the offsets in time, phase, frequency, or derivatives thereof respectively of signals received from the transmission sources relative to a reference source or to each other; and
(c) means for combining the offsets so determined and calculating the list of offsets corresponding to the given location relative to the common reference.

DETAILED DESCRIPTION OF THE EXEMPLARY EMBODIMENTS

Figure 1:
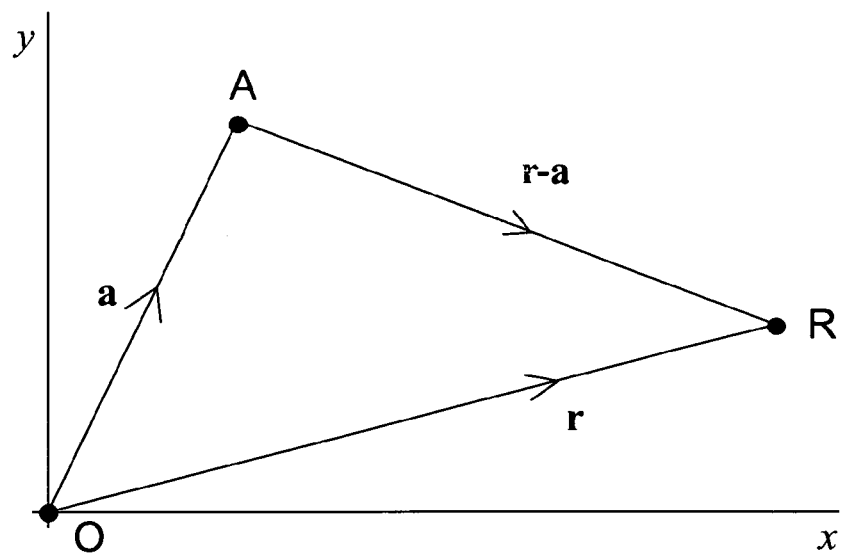
FIG. 1 shows the geometry of a CURSOR system as described in EP-A-0 880 712.

A radio positioning method and system including either of the methods and apparatus defined above also form part of the present invention.

The invention also includes apparatus (a 'virtual LMU') for carrying out either or both of these methods. The apparatus may include a computer (located anywhere convenient) and programmed to carry out the required process. Although the following description of a particular application of the invention concerns signals in a digital telephone network, it will be apparent that the invention is by no means restricted to this application but may be applied to any network of one or more transmitters, synchronised or unsynchronised, set up for any purpose.

A virtual LMU includes a computer process which may run on any computer platform able to obtain data from real LMUs. Accordingly, a further aspect of the invention includes a method of calculating and maintaining a list of offsets in time, phase, frequency, or derivatives thereof, or their equivalents expressed as offsets in distance or derivatives thereof, of a plurality of transmission source signals, corresponding to a given location, relative to a common reference.

It is assumed that the network of BTSs is unsynchronised in that the transmission time offsets of the BTS signals bear no constant or known relationship to each other, but that nevertheless the BTS oscillators are quite stable, so that their instantaneous frequencies change only slowly with time. In these circumstances, it is possible to predict the currently received offset in time, phase, frequency, or derivatives thereof of the signals from a given BTS by a given real LMU from sufficiently-recent historical data. The real LMUs in the network make measurements of all the BTSs they can detect in a cyclic fashion, repeating the cycle every few seconds. They maintain these measurements in a stack, replacing the oldest measurements with the most recent. A linear or low-order polynomial fit to the measurements therefore provides a predictor for extrapolation into the near future, or for interpolation in the recent past. Assume that the BTS oscillators are sufficiently stable that reliable predictions can be made over a period of, say, ten minutes. Then, every few minutes, the virtual LMU (VLMU) contacts each real LMU and receives its predictors for the received offsets of the signals from all the BTSs in its measurement set. It is likely that many of the BTSs will have been measured by more than one LMU, so the VLMU analyses the complete data set from all the real LMUs using well-known methods to determine both (a) the best values of the real LMU internal clock offsets in time, phase, frequency, or derivatives thereof, and hence (b) the received offsets in time, phase, frequency, or derivatives thereof of the signals from all the BTSs which would have been measured by a real LMU located at the assumed position of the VLMU and capable of receiving signals from every BTS.

In the above description of the function of the VLMU, it should be understood that any or all of the LMUs could be replaced by other receivers, not necessarily fixed or at known positions, which have not been set up specifically as LMUs. For example, the data from a number of handsets could be used to determine frequency offsets if the handsets were stationary. Furthermore, it is shown in a related patent application Ser. No. 09/830,452 filed simultaneously herewith, how the positions and velocities of handsets can be determined without the need for any LMUs at all.

Particular advantages of using a VLMU in a network include the following:
(a) a full match can be guaranteed between a handset's measurements and a single (virtual) LMU;
(b) the VLMU process minimises the timing errors in individual LMU measurements;
(c) the VLMU list is immediately available to the position calculation process, increasing the speed of computation;
(d) when combined with the ideas described in a related patent application Ser. No. 09/830,452 filed simultaneously herewith, a list of receive time offsets can be created in a network of BTSs where there are few if any real LMUs;
(e) the VLMU provides, in effect, a synchronisation map of the real LMU network which network may then be used to monitor the BTS network and, in particular, to determine locations of newly-installed BTSs.

Figure 2:
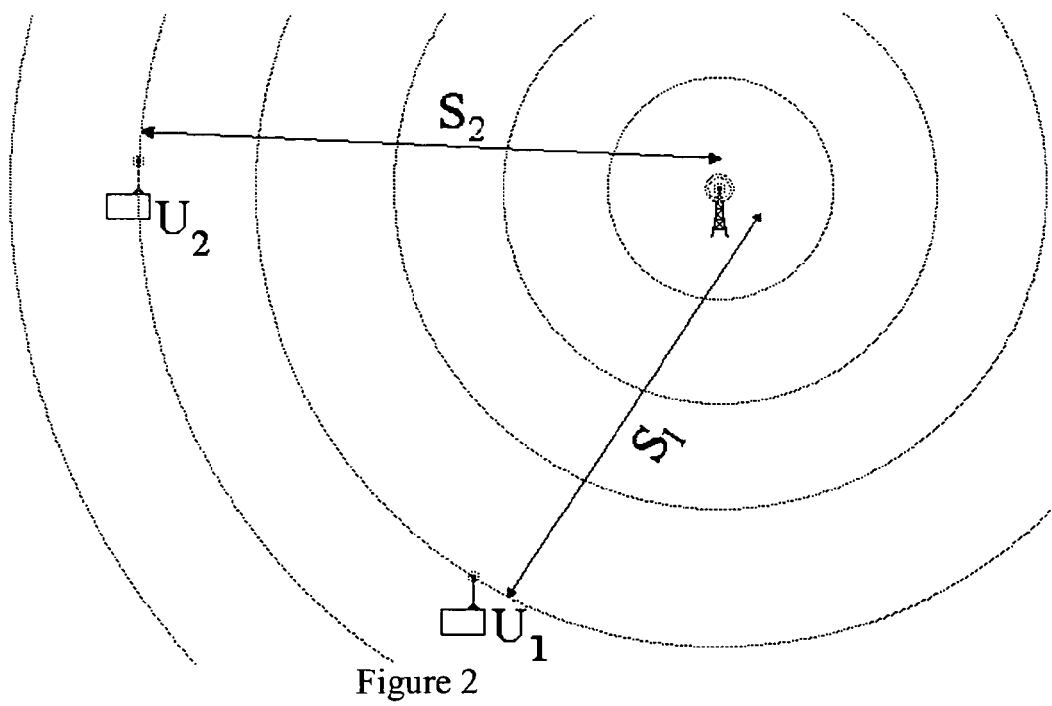
FIG. 2 shows adjacent LMUs making measurements of a common BTS.
Figure 3:
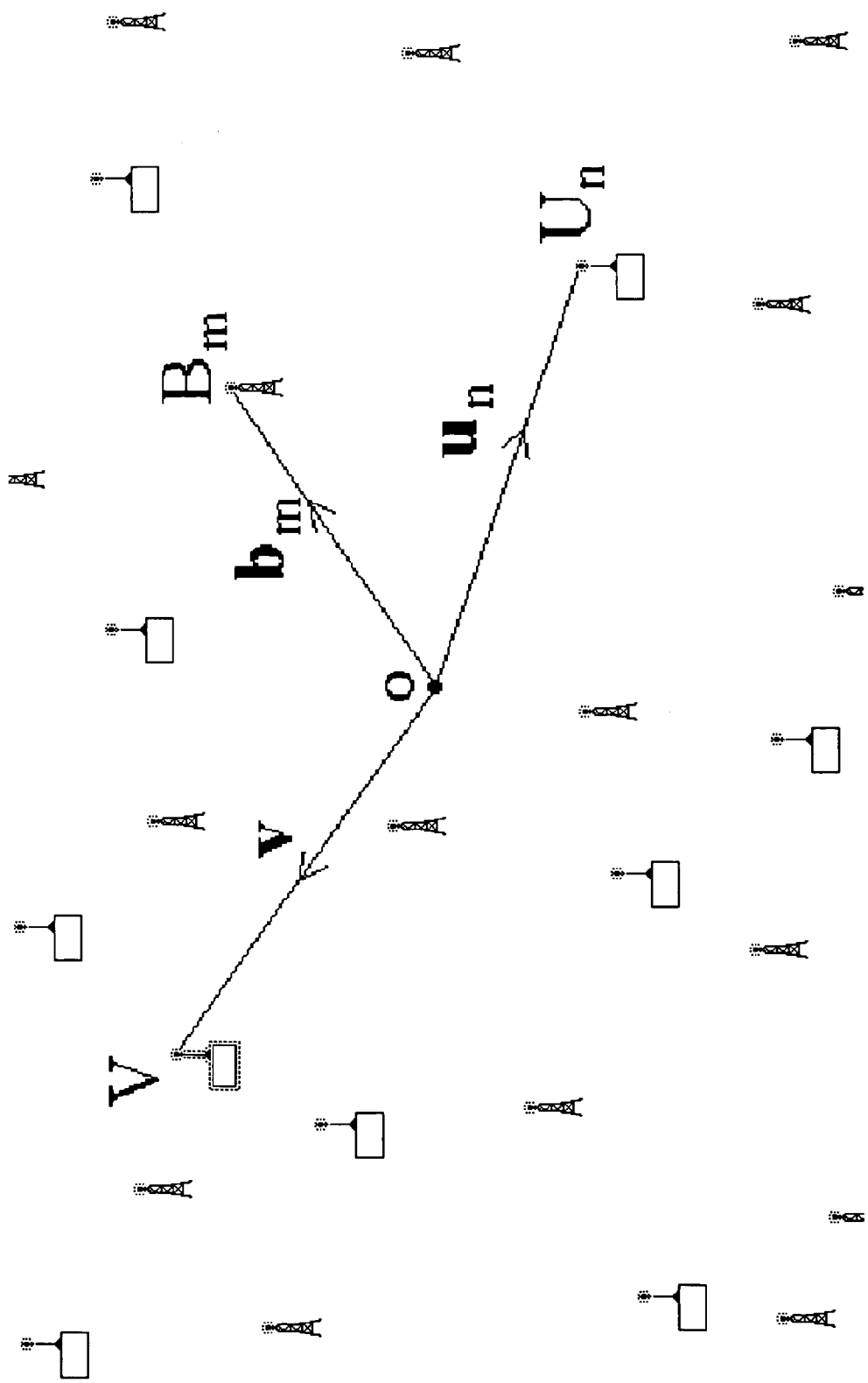
FIG. 3 shows a network of real and virtual LMUs in a system of the invention.
Figure 4:
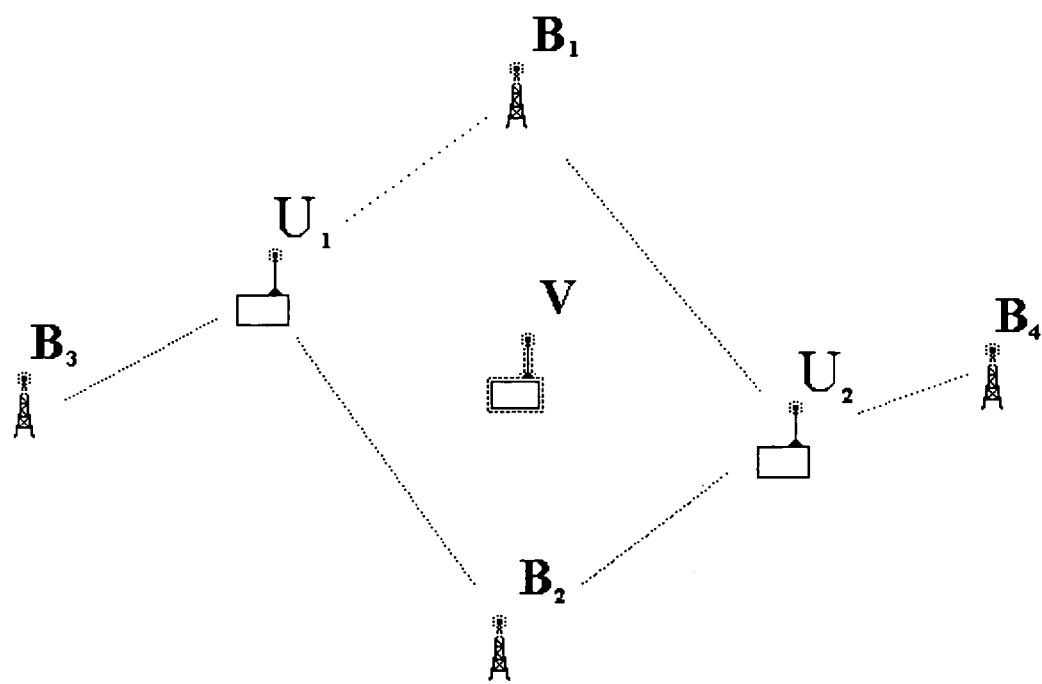
FIG. 4 illustrates a similar, simplified network.
Figure 5:
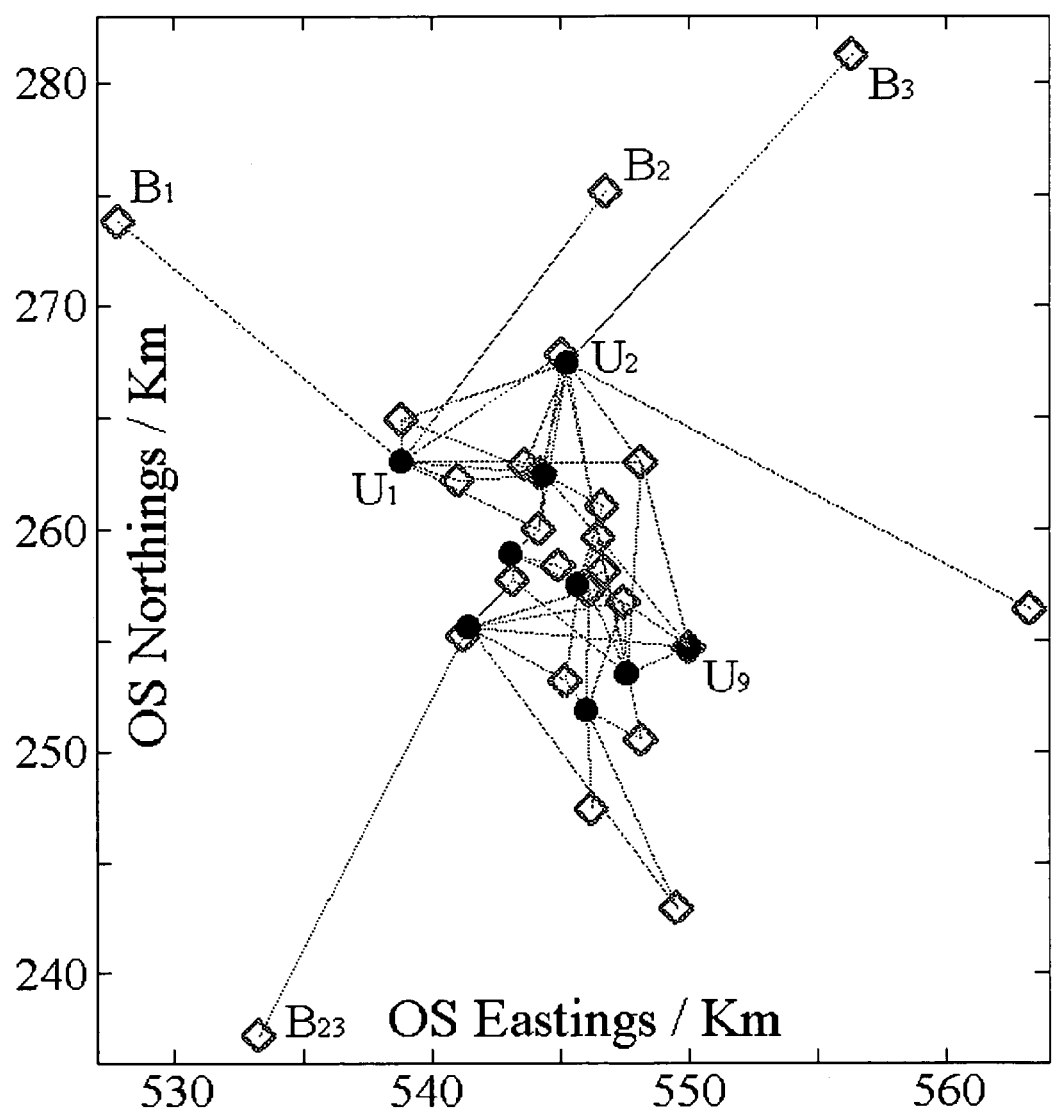
FIG. 5 shows the positions of LMU sites and BTS sites in a real network.
Figure 6:
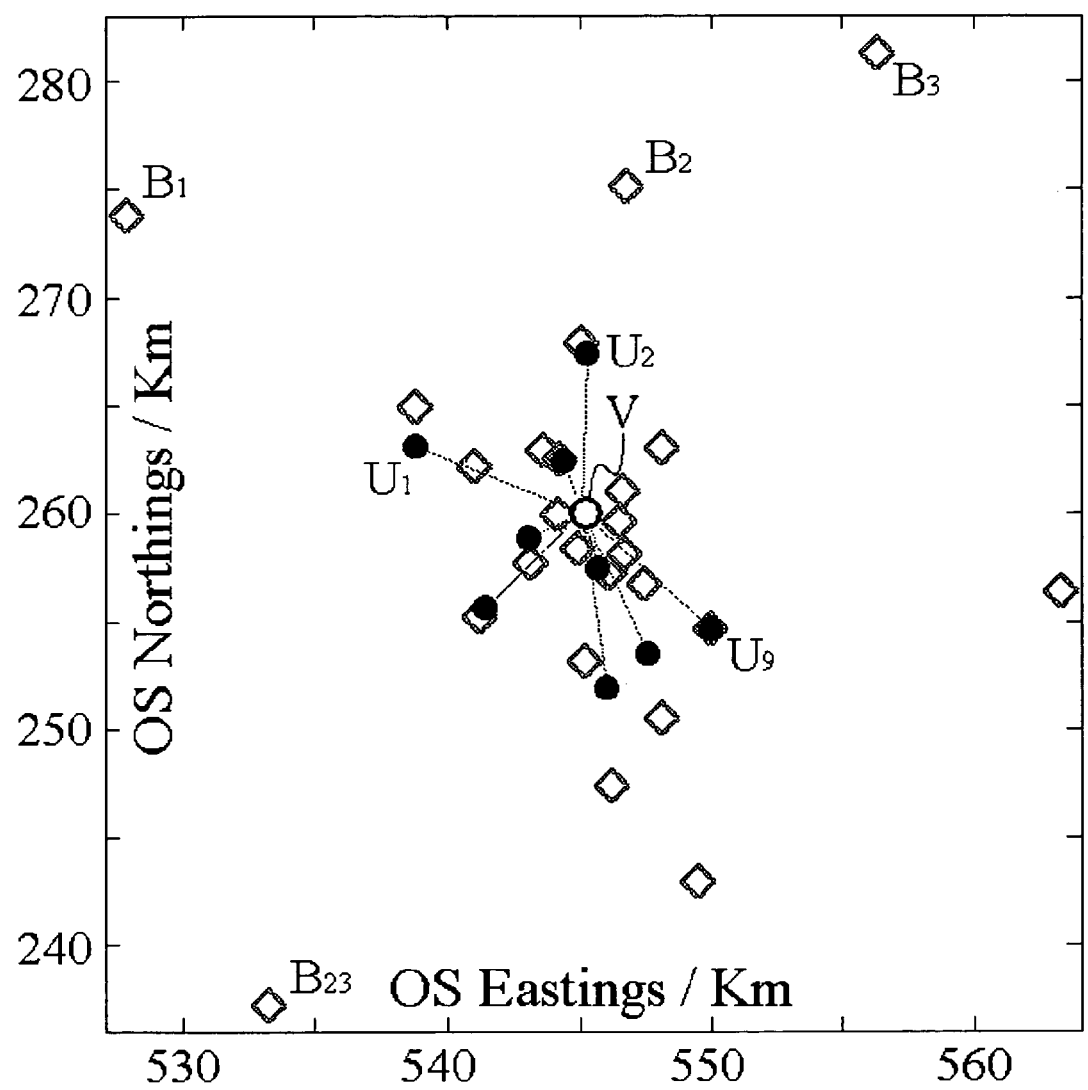
FIG. 6 shows the same network with the addition of a Virtual LMU.
Figure 7:
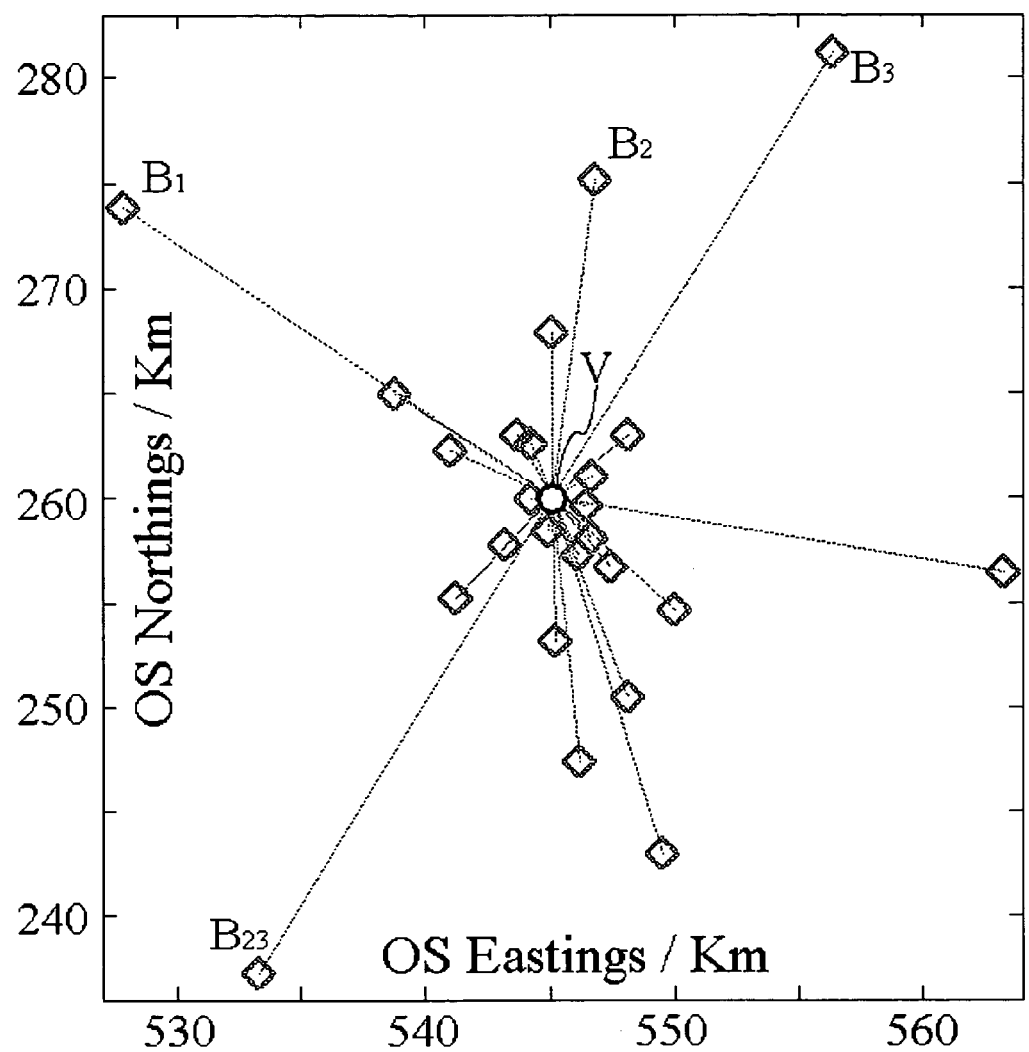
FIG. 7 shows the same network with the real LMUs replaced by the Virtual LMU.
Figure 8:
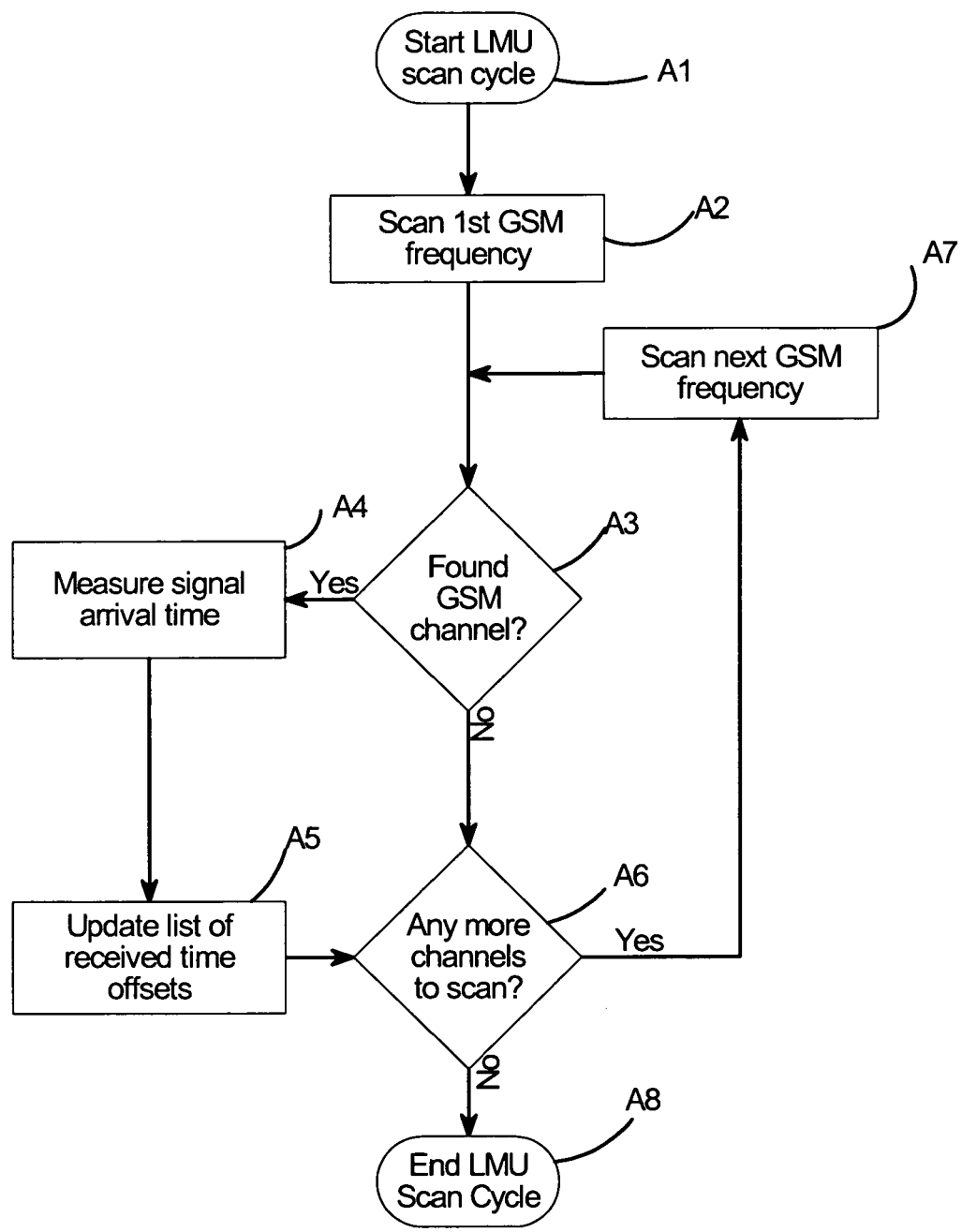
FIG. 8 illustrates, by way of a flow chart, the processing which takes place inside an LMU.
Figure 9:
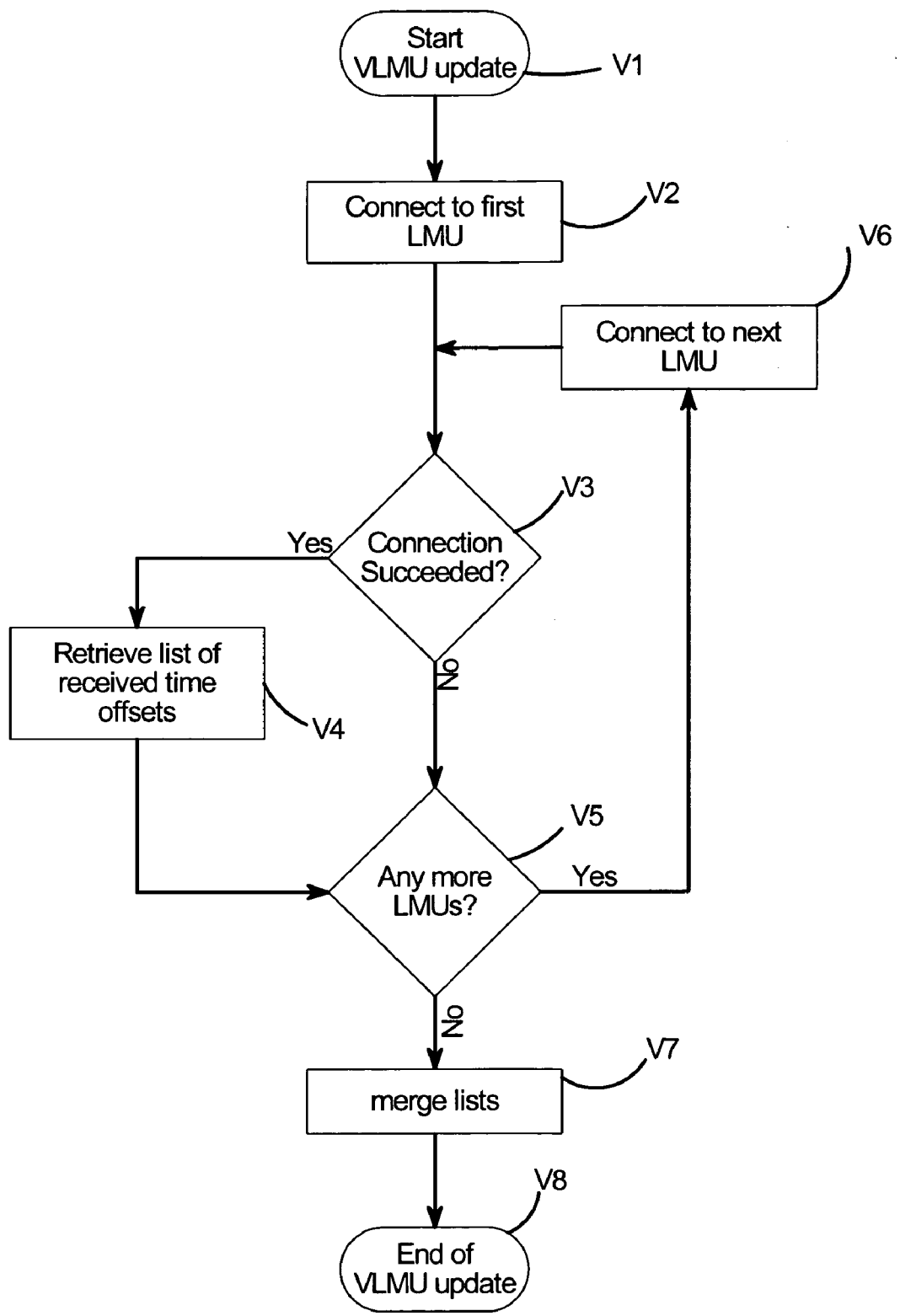
FIG. 9 illustrates, by way of a flow chart, the processing which takes place inside the VLMU.
Figure 10:
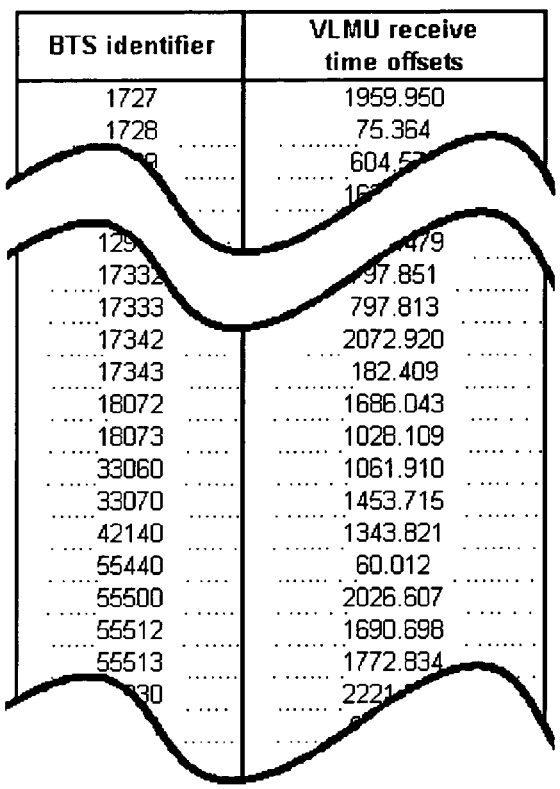
FIG. 10 shows a list of timing offsets generated in a real system such as that shown in the example of FIGS. 5 to 9.
Figure 11:
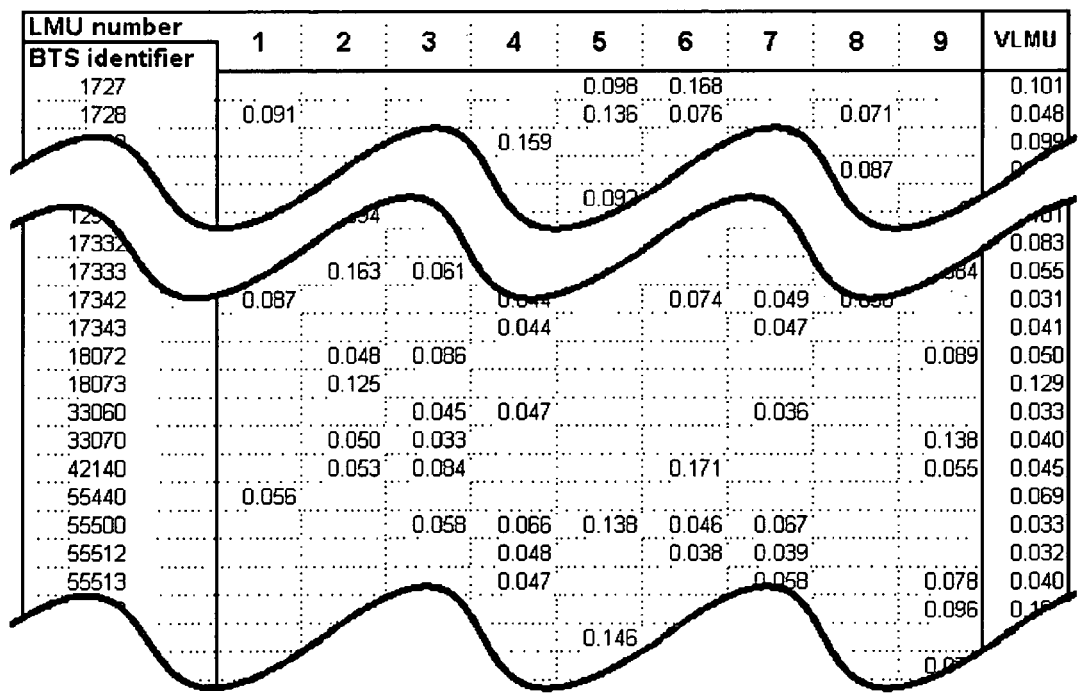
FIG. 11 shows a table of timing errors associated with LMUs and a virtual LMU in this example.

One example of a method and apparatus according to the present invention will now be described with reference to the accompanying drawings, in which:
FIG. 1 shows the geometry of a CURSOR system as described in EP-A-0 880 712;
FIG. 2 shows adjacent LMUs making measurements of a common BTS;
FIG. 3 shows a network of real and virtual LMUs in a system of the invention;

FIG. 4 illustrates a similar, simplified network;

FIG. 5 shows the positions of LMU sites and BTS sites in a real network;

FIG. 6 shows the same network with the addition of a Virtual LMU;

FIG. 7 shows the same network with the real LMUs replaced by the Virtual LMU;

FIG. 8 illustrates, by way of a flow chart, the processing which takes place inside an LMU;

FIG. 9 illustrates, by way of a flow chart, the processing which takes place inside the VLMU;

FIG. 10 shows a list of timing offsets generated in a real system such as that shown in the example of FIGS. 5 to 9; and FIG. 11 shows a table of timing errors associated with LMUs and a virtual LMU in this example.

By way of example, and with reference to FIG. 3, the function of a virtual LMU is now described which determines timing offsets.

Consider a network of N real LMUs and M BTSs which includes a virtual LMU (VLMU). The position of the $n^{th}$ LMU, $U_n$, is represented by the vector $u_n$ and the position of the $m^{th}$ BTS, $B_m$, is represented by the vector $b_m$, both vectors being with respect to the same origin. Signals radiated by BTS m will be received by LMU n after a time lag, and the measurement of this time lag, $\Delta t_{nm}$, is given by $$\Delta t_{nm} = |u_n - b_m|/\upsilon + \epsilon_n + \alpha_m \pm \sigma_{nm}, \quad (7)$$

where $\epsilon_n$ is the clock time offset of LMU n, $\alpha_m$ is the transmission time offset of BTS m, both with respect to an imaginary universal 'absolute' clock, and $\sigma_{nm}$ is an estimate of the error in the measurement of $\Delta t_{nm}$. The assumed position of the virtual LMU, V, is represented by the vector v. If the VLMU were able to receive the signals directly from BTS m without error then it would measure a receive time offset, $\beta_m$, relative to the imaginary universal absolute clock, given by $$\beta_m = |v - b_m|/\upsilon + \alpha_m. \quad (8)$$

Substituting for $\alpha_m$ in equation (7) using the value deduced from equation (8) gives $$\Delta t_{nm} = |u_n - b_m|/\upsilon + \beta_n + \beta_m - |v - b_m|/\upsilon \pm \sigma_{nm}. \quad (9)$$

Over the entire network of N LMUs, all of the M BTSs are visible. Each individual LMU, however, will only see a few of them, but as long as there is significant overlap of visibility, it is possible to take the set of all $\Delta t$ values and solve for values of $\epsilon_n$ and $\beta_m$. Hence the VLMU can calculate timings for any BTS as if the network of LMUs were synchronised, or as if just one LMU (the VLMU, V) was all that was needed to cover the entire BTS network.

To illustrate this further, a simplified problem is shown and solved below using N=2 and M=4, i.e. a network consisting of just 2 LMUs monitoring 4 BTSs (see FIG. 4). For simplicity it is chosen that $\epsilon_1=0$. This is allowed as the 'absolute' clock time is completely arbitrary and may, for example, be measured by the internal clock of LMU number one. (Note, however, that this choice does introduce an asymmetry into the solution in that the error associated with BTSs three and four are not the same.) The first LMU ($U_1$) can receive signals from BTS numbers one, two and three, but cannot receive the signals from BTS number four. The second LMU ($U_2$) can receive the signals from BTSs one, two and four, but cannot see BTS number three. The equations can be written in matrix form as $$\begin{pmatrix} 1 & 0 & 0 & 0 & 0 \\ 0 & 1 & 0 & 0 & 0 \\ 0 & 0 & 1 & 0 & 0 \\ 1 & 0 & 0 & 0 & 1 \\ 0 & 1 & 0 & 0 & 1 \\ 0 & 0 & 0 & 1 & 1 \end{pmatrix} \begin{pmatrix} \beta_1 \\ \beta_2 \\ \beta_3 \\ \beta_4 \\ \epsilon_2 \end{pmatrix} = \begin{pmatrix} \Delta t_{11} - \frac{|u_1 - b_1| - |v - b_1|}{\upsilon} \\ \Delta t_{12} - \frac{|u_1 - b_2| - |v - b_2|}{\upsilon} \\ \Delta t_{13} - \frac{|u_1 - b_3| - |v - b_3|}{\upsilon} \\ \Delta t_{21} - \frac{|u_2 - b_1| - |v - b_1|}{\upsilon} \\ \Delta t_{22} - \frac{|u_2 - b_2| - |v - b_2|}{\upsilon} \\ \Delta t_{24} - \frac{|u_2 - b_4| - |v - b_4|}{\upsilon} \end{pmatrix} + Z \quad (10)$$

or equivalently as $A \cdot x = b + Z$, where Z is an unknown vector of the actual errors on each measurement.

The standard technique known as 'least squares' postulates that the estimate for x which minimises Z is given by $$x = (A^T W A)^{-1} A^T W b, \quad (11)$$

where the symbol $A^T$ indicates the transpose of the matrix A, and the matrix W is defined by $$W = \begin{pmatrix} \frac{1}{\sigma_{11}^2} & 0 & 0 & 0 & 0 & 0 \\ 0 & \frac{1}{\sigma_{12}^2} & 0 & 0 & 0 & 0 \\ 0 & 0 & \frac{1}{\sigma_{13}^2} & 0 & 0 & 0 \\ 0 & 0 & 0 & \frac{1}{\sigma_{21}^2} & 0 & 0 \\ 0 & 0 & 0 & 0 & \frac{1}{\sigma_{22}^2} & 0 \\ 0 & 0 & 0 & 0 & 0 & \frac{1}{\sigma_{24}^2} \end{pmatrix}. \quad (12)$$

This particular example can be solved explicitly. For simplicity, it is assumed that all the values of $\sigma_{nm}$ are the same, and equal to $\sigma$ This gives the result $$\beta_1 = (3D_{11} + D_{12} + D_{21} - D_{22})/4 \pm 0.87\sigma,$$

$$\beta_2 = (3D_{12} + D_{11} + D_{22} - D_{21})/4 \pm 0.87\sigma,$$

$$\beta_3 = D_{13} \pm 1.00\sigma,$$

$$\beta_4 = (2D_{24} + D_{11} + D_{12} - D_{21} D_{22})/2 \pm 1.41\sigma,$$

$$\epsilon_2 = (D_{21} + D_{22} - D_{11} - D_{12})/2 \pm 1.00\sigma, \quad (13)$$

where $$D_{nm} = \Delta t_{nm} - \frac{|u_n - b_m| - |v - b_m|}{\upsilon}. \quad (14)$$

Note that even in this simple case, when a BTS is seen by both LMUs, the errors in the calculated offsets are less than those in each of the measurements themselves. This is an important advantage of the virtual LMU method.

The LMUs may also contain other means of synchronisation. For example, each real LMU could be connected to a GPS or other timing reference receiver, G, which serves to provide the common timing reference. In this case, the LMU network may be considered as synchronised already to this common timing reference (say GPS standard time), and then the VLMU need not solve for the individual values of $\epsilon$ as these are already known. One advantage of using other means of synchronisation is that there is no longer a requirement for overlap of visibility of BTSs between adjacent LMUs. If each BTS site also carried an LMU, then that LMU would need only to be able to receive the (very strong) signals from its co-sited BTS transmitter(s), thereby simplifying the installation of the LMU antenna.

The VLMU mode of operation described above may be called the 'pull mode' as it requires the VLMU to instigate data transfer to itself from every real LMU. It is also possible to have each real LMU continuously check the difference between its own prediction of the receive time offset from every BTS using the values calculated from the set of predictors last sent to the VLMU and the actual measured values. When any one of these differences exceeds a given value, the LMU can send its new predictor set to the VLMU. This mode of operation may be called the 'push mode'. The particular mode appropriate for a real system depends, amongst other things, on the stability of the BTS network.

An example of a prototype system constructed in accordance with the invention will now be described, in which timing measurements made by a number of LMUs are combined to create a list of receive time offsets for all the GSM BTSs in and around Cambridge, UK, as if they were observed by a single "Virtual" LMU.

The positions of nine LMUs, $U_1$-$U_9$ (shown as filled circles) and twenty three Cambridge area BTSs, $B_1$-$B_{23}$ (shown by unfilled squares) are plotted in FIG. 5 on an Ordinance Survey (OS) grid. Each LMU comprises (a) hardware including an internal clock, a GSM radio, a computer, and a telephone connection, and (b) software including a program to compile a list of receive time offsets.

FIG. 8 illustrates, by way of a flow chart, the main elements of the LMU software residing in each LMU, $U_1$-$U_9$. Every few seconds the "scan cycle" program is entered at step A1. The program proceeds, in steps A2, A3, A6 and A7, to tune the GSM radio to each GSM transmission channel in turn and scan for BCCH signals. In the event that a BCCH signal is detected in step A3, the program calculates the receive time offset of the signal relative to its internal clock (in step A4) and updates its list of time offsets accordingly in step A5. The BCCH is also decoded to produce the ID of the BTS Bn from which the signal is received. FIG. 5 also shows lines between LMUs and the BTSs detected by them as a result of the scan cycle routine.

FIG. 6 shows the positions of the nine LMUs, the twenty three BTSs monitored by those LMUs and a Virtual LMU V (plotted as an unfilled circle). The Virtual LMU V comprises (a) hardware including a telephone connection to each real LMU and a computer, and (b) software including a program to compile a list of "virtual" receive time offsets.

FIG. 9 illustrates, by way of a flow chart, the main elements of the VLMU software. Every 4 minutes the "VLMU update" program is entered at step V1. The program proceeds, in steps V2, V3, V5 and V6, to connect to each of the real LMUs via the telephone connections. If the connection to a given LMU $U_1$-$U_9$ succeeds, the program, in step V4, extracts that LMU's list of receive time offsets. On completion of the connection cycle, the program (in step V7) combines the data to produce a list of receive time offsets for all the BTSs monitored by the LMU network. An example of this list is shown in FIG. 10 where part of a table of receive time offsets generated by the VLMU is reproduced. The first column shows the BTS identifier and the figures in the table are in units of 1.85 microseconds. FIG. 6 also shows lines between the VLMU V and each real LMU $U_1$-$U_9$ from which the VLMU software is able to extract a list of time offsets.

Once the "VLMU update" has been completed, the combined list of timings generated is equivalent to that which would have been observed had there been a single (real) LMU at the VLMU's location making timing measurements of every BTS in the network. FIG. 7 illustrates this equivalence by showing the virtual monitoring of each BTS's timing measurements by the Virtual LMU (shown as lines between the VLMU V and the BTSs $B_1$-$B_{23}$).

Each timing measurement has an associated error which, in most cases, is smaller than the errors in the timing measurements made by the individual real LMUs. This is illustrated in the table of FIG. 11, which shows part of the list produced by the VLMU during operation. The first column shows the identifier of each BTS. The columns headed 1 to 9 each relate to a particular one of the nine real LMUs. The figures in the table are errors in the timing measurements made by the real LMUs of the signals from the corresponding BTSs. An empty cell indicates that the LMU is unable to receive a BTS's signal. The column headed VLMU shows the result of combining the measurements using the method outlined above.

The timings in the table of FIG. 11 are in units of 1.85 microseconds. Note that the VLMU timing errors are generally smaller than those estimated for real LMU timings, confirming an advantage of the VLMU method in reducing errors.

What is claimed is:

1. A method of generating in a virtual location measurement unit a list of offsets relative to a common reference, said list of offsets being in time, phase, frequency, or derivatives thereof, or their equivalents expressed as offsets in distance or derivatives thereof, of a plurality of transmission source signals, which would be received at a given location, the method comprising;
   (a) acquiring, in the virtual location measurement unit, data from plural receivers, the plural receivers not necessarily fixed or at known positions the data from each of the plural receivers comprising offsets in time, phase, frequency, or derivatives thereof, respectively of signals received from the transmission sources relative to a reference source in each receiver or to each other; and
   (b) combining the acquired data and calculating the list of offsets relative to the common reference in the virtual location measurement unit.

2. A method of generating in a virtual location measurement unit a list of offsets relative to a common reference, said list of offsets being in time, phase, frequency, or derivatives thereof, or their equivalents expressed as offsets in distance or derivatives thereof, of a plurality of transmission source signals, which would be received at a given location, the method comprising;
   (a) acquiring, in the virtual location measurement unit, data from plural receivers, the plural receivers not necessarily fixed or at known positions, the data from each of the plural receivers being representative of the received signals;
   (b) determining from the acquired data, in the virtual location measurement unit, the offsets in time, phase, frequency, or derivatives thereof, respectively of signals received from the transmission sources relative to a reference source in each receiver or to each other; and (c) combining the determined offsets and calculating the list of offsets relative to the common reference in the virtual location measurement unit.

3. A radio positioning method for determining a position of one receiver or positions of more receivers, which the position of one receiver or the positions of more receivers are unknown, which method comprises generating the list of offsets according to claim 1 or claim 2.

4. A radio positioning method according to claim 3, wherein the common reference comprises an external reference.

5. A radio positioning method according to claim 4, wherein the common reference comprises a GPS signal.

6. A radio positioning method according to claim 3, wherein the step of acquiring data from said plural receivers includes instigating acquisition of said data from a common location.

7. A radio positioning method according to claim 3, wherein the step of acquiring data from said plural receivers includes instigating acquisition of said data from each said receiver at times determined by each said receiver.

8. Apparatus for generating, in a virtual location measurement unit, a list of offsets relative to a common reference, said list of offsets being in time, phase, frequency, or derivatives thereof, or their equivalents expressed as offsets in distance or derivatives thereof, of a plurality of transmission source signals, which would be received at a given location, the method comprising;
   (a) means for acquiring, in the virtual location measurement unit, data from plural receivers, the plural receivers not necessarily fixed or at known positions, the data from each of the plural receivers comprising offsets in time, phase, frequency, or derivatives thereof, respectively of signals received from the transmission sources relative to a reference source in each receiver or to each other; and
   (b) means for combining the acquired data and calculating the list of offsets relative to the common reference in the virtual location measurement unit.

9. Apparatus for generating, in a virtual location measurement unit, a list of offsets relative to a common reference, said list of offsets being in time, phase, frequency, or derivatives thereof, or their equivalents expressed as offsets in distance or derivatives thereof, of a plurality of transmission source signals, which would be received at a given location, the method comprising;
   (a) means for acquiring, in the virtual location measurement unit, data from plural receivers, the plural receivers not necessarily fixed or at known positions, the data from each of the plural receiver being representative of the received signals;
   (b) means for determining from the acquired data, in the virtual location measurement unit, the offsets in time, phase, frequency, or derivatives thereof, respectively of signals received from the transmission sources relative to a reference source in each receiver or to each other; and
   (c) means for combining the determined offsets and calculating the list of offsets relative to the common reference in the virtual location measurement unit.

10. A radio positioning system including apparatus according to claim 8 or to claim 9.

11. A radio positioning system according to claim 10, wherein the common reference comprises a reference external to said receivers.

12. A radio positioning system according to claim 11, wherein the common reference comprises a GPS signal.

13. A radio positioning system according to claim 10, wherein the means for acquiring data from said plural receivers includes a computer system arranged to instigate the transfer of said data from said plural receivers to said computer system at times determined by said computer system.

14. A radio positioning system according to claim 10, wherein the means for acquiring data from said plural receivers includes a computer system, and including means for instigating said acquisition of data from each said receiver at times determined by each said receiver.

15. A digital telephone network, including a radio positioning system according to claim 10.

* * * * *